(No Model.)
E. M. VAN VALKENBURG.
VEHICLE THILLS.
No. 466,386. Patented Jan. 5, 1892.
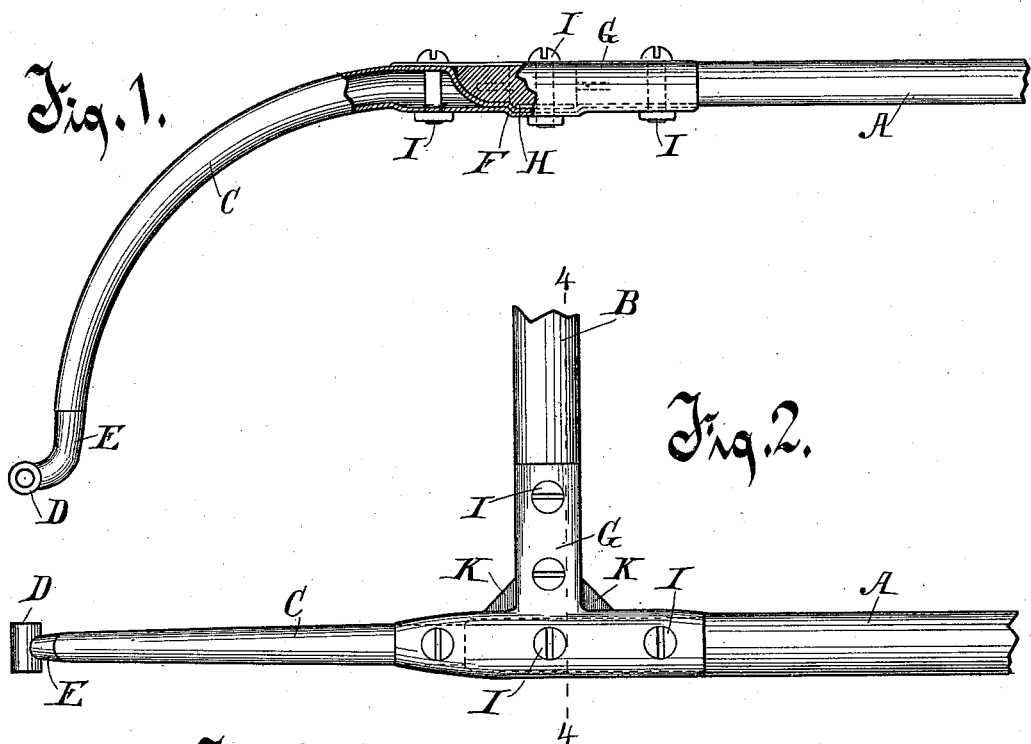

UNITED STATES PATENT OFFICE.

ELLIS M. VAN VALKENBURG, OF RACINE, WISCONSIN, ASSIGNOR TO THE ACME ADJUSTABLE POLE COMPANY, OF SAME PLACE.

VEHICLE-THILLS.

SPECIFICATION forming part of Letters Patent No. 466,386, dated January 5, 1892.

Application filed July 9, 1891. Serial No. 398,881. (No model.)

*To all whom it may concern:*

Be it known that I, ELLIS M. VAN VALKENBURG, of Racine, in the county of Racine and State of Wisconsin, have invented a new and useful Improvement in Thills, of which the following is a description, reference being had to the accompanying drawings, which are a part of this specification.

My invention consists in devices embodied in the construction of thills for a vehicle, whereby the thills are made light in weight but strong and durable, and are neat in appearance, and the expense of construction is reduced to a minimum.

Figure 1 is a side view of so much of a pair of thills as includes my invention, portions being broken away and shown in section to exhibit interior construction. Fig. 2 is a top plan view of my improved devices embodied in thills. Fig. 3 is an under side view of my improved devices. Fig. 4 is a section on line 4 4 of Fig. 2.

In the drawings, A is one of the shafts of a pair of thills, and E is a fragment of the cross-bar by which the two shafts of the thills are connected. The shafts are each continued rearwardly from the cross-bar in and by a shank C, constructed of metal tubing, which terminates at its rear end in a head D, provided with a short solid neck E, which is welded or otherwise secured rigidly to the shank C. The heads D are adapted for connecting the thills by suitable coupling to the front axle of the vehicle.

To secure the shank C, the shafts A, and the cross-bar B permanently together, I crush or flatten the tube of which the shank C is made for a distance from that end which is united with the shaft A, forcing the top and side walls of the tube down against and flatten it out upon the bottom wall of the tube, forming a flat projection or tang F, substantially as wide as the width of the shaft A. This tang is fitted to and bears against the under surface of the shaft near its rear extremity and opposite the junction of the bar therewith. An angle-iron G, the several arms of which are in inverted-U shape in cross-section, is fitted to the top and sides of the shaft A, the cross-bar B, and the shank C, respectively, inclosing in cap form the top and sides of these several parts. A metal strap H, one end of which is inserted between the tang F and the shaft A, projects therefrom underneath and bearing against the cross-bar B, the edges of which strap are covered by the angle-iron G. The angle-iron and the strap H are secured to the shafts, the cross-bar, and the shank, and these several parts are held together by the bolts I inserted therethrough. Ribs or webs K, constructed integral with the angle-iron in the angles thereof, support and strengthen the construction.

What I claim as new, and desire to secure by Letters Patent, is—

1. In thills, the combination, with the shaft, of a shank consisting of metal tubing a portion of which near its outer end has one wall bent in against and flattened with the opposite wall, forming a flat tang integral with the tubing, which tang is of double thickness and is fitted against the under side of the shaft and secured thereto, substantially as described.

2. In thills, the combination of a shaft, a shank constructed of metal tubing, a tang formed of the tubing by bending in one side of the tubing against and flattening it with the opposite side, forming a tang of double thickness, which tang bears against the shaft on the under side, a cross-bar uniting the shafts, and a cap angle-iron inclosing the top and sides of the shaft, the shank, and the cross-bar at and near their points of junction and secured thereto by bolts, substantially as described.

3. In thills, a cap angle-iron having legs in T shape, which legs are U form in cross-section, adapted to inclose the top and sides of and to unite the shaft, the cross-bar, and the shank of thills, substantially as described.

In testimony whereof I affix my signature in presence of two witnesses.

ELLIS M. VAN VALKENBURG.

Witnesses:
GEO. R. WEST, Jr.,
E. GERTENBACH.